United States Patent
Hoelz

(10) Patent No.: US 10,112,239 B2
(45) Date of Patent: Oct. 30, 2018

(54) TOOL HOLDER

(71) Applicant: Hilti Aktiengesellschaft, Schaan (LI)

(72) Inventor: Kevin Hoelz, Gomadingen (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 15/305,544

(22) PCT Filed: Apr. 21, 2015

(86) PCT No.: PCT/EP2015/058556
§ 371 (c)(1),
(2) Date: Oct. 20, 2016

(87) PCT Pub. No.: WO2015/162109
PCT Pub. Date: Oct. 29, 2015

(65) Prior Publication Data
US 2017/0043409 A1   Feb. 16, 2017

(30) Foreign Application Priority Data
Apr. 22, 2014 (EP) .................................. 14165392

(51) Int. Cl.
*B23B 31/107* (2006.01)
*B25B 23/00* (2006.01)

(52) U.S. Cl.
CPC ...... *B23B 31/1071* (2013.01); *B25B 23/0035* (2013.01); *B23B 2231/0252* (2013.01)

(58) Field of Classification Search
CPC ........ B23B 31/1071; B23B 2231/0252; B23B 31/1074; B23B 31/107; B23B 2231/46; B23B 31/06; B25B 23/0035
See application file for complete search history.

(56) References Cited

U.S. PATENT DOCUMENTS 4,290,617 A * 9/1981 Yoshida .............. B23B 31/1071
                                                   279/75
6,695,321 B2   2/2004 Bedi et al.
(Continued)

FOREIGN PATENT DOCUMENTS

EP    0 206 612 A2   12/1986
EP    2 067 577 A1    6/2009

OTHER PUBLICATIONS

PCT/EP2015/058556, International Search Report dated Jul. 8, 2015, with partial English translation (Five (5) pages).

*Primary Examiner* — Daniel Howell
*Assistant Examiner* — Paul M Janeski
(74) *Attorney, Agent, or Firm* — Crowell & Moring LLP

(57) ABSTRACT

A tool holder is disclosed. The tool holder has a tubular main part, a locking element, which lies in the first radial channel of the main part, and an actuating sleeve which can be moved between a removal position and a locking position. The main part has a depression on the outside and a second radial channel which passes into the receiving area starting from the depression. The actuating sleeve has a radially pre-tensioned latching element which engages into the depression in the removal position. An ejection element is guided in the second radial element where the ejection element is pushable by the latching element into a position which partially protrudes into the receiving area and where the ejection element displaces the latching element out of the depression when the ejection element is moved to a position which is retracted from the receiving area.

7 Claims, 4 Drawing Sheets

(56) References Cited

U.S. PATENT DOCUMENTS

| | | | |
|---|---|---|---|
| 7,469,909 B2 | 12/2008 | Strauch et al. | |
| 2006/0163824 A1* | 7/2006 | Sasaki | B23B 31/1071 279/75 |
| 2008/0121075 A1* | 5/2008 | Meng | B25B 15/001 81/177.85 |
| 2010/0031787 A1* | 2/2010 | Hu | B25B 13/481 81/477 |
| 2010/0207335 A1* | 8/2010 | Lin | B25B 15/001 279/22 |
| 2014/0015205 A1* | 1/2014 | Viuf | B25B 15/001 279/46.1 |

* cited by examiner

TOOL HOLDER

This application claims the priority of International Application No. PCT/EP2015/058556, filed Apr. 21, 2015, and European Patent Document No. 14165392.3, filed Apr. 22, 2014, the disclosures of which are expressly incorporated by reference herein.

BACKGROUND AND SUMMARY OF THE INVENTION

The present invention relates to a tool, in particular for an electric screwdriver with a self-locking tool holder, which can be unlocked through pushing a sleeve opposite to the direction of insertion.

U.S. Pat. No. 6,695,321 discloses a tool holder for a screwdriver bit. The locking of the tool occurs manually. A ball partially protruding into the receiving area is held in a starting position through an actuating sleeve in a radial direction. The user can push the actuating sleeve along an axis and lift the hold. Upon insertion of the screwdriver bit, the ball moves aside in a radial direction. A spring pushes the actuating sleeve into the starting position.

U.S. Pat. No. 7,469,909 discloses a tool holder which automatically locks a screwdriver bit. The user inserts a screwdriver bit in the direction of insertion into a receiving area of the tool holder. A locking ball lies in a slot and partially protrudes into the receiving area. The screwdriver bit pushes the ball into the slot. The locking ball is initially held in a radial direction through an interior face of an actuating sleeve. The interior face expands conically in the direction of insertion, such that the locking ball can exit the receiving area radially near the machine-side end of the slot. The ball falls back into the receiving area when the locking groove of the screwdriver bit reaches the end of the slot. A spring pushes the locking ball to the tool-side end of the slot and the tapered end of the interior face of the actuating sleeve. To unlock, the user pushes the actuating sleeve opposite to the direction of insertion and pulls out the screwdriver bit. The locking ball moves aside in a radial direction.

The tool holder according to the invention has a tubular main part, a locking element, and an actuating sleeve. The tubular main part features a prismatic receiving area coaxial to a working axis for receiving a tool and a first radial channel. The locking element can be moved along the first radial channel in a radial direction between a position partially protruding into the receiving area and a position retracted from the receiving area. The actuating sleeve can be moved on the main part along the working axis between a locking position for locking the tool in the receiving area and a removal position for removing the tool from the receiving area. The actuating sleeve has a stop face and a pocket. In the locking position, the stop face overlaps with the first radial channel, and the locking element is obstructed by the stop face in the position protruding into the receiving area. In the removal position, the pocket overlaps with the first radial channel and the locking element is moveable in the position retracted from the receiving area by the locking element partially submerging in the pocket. A spring pre-tensions the actuating sleeve in the direction from the removal position into the locking position.

The main part has a depression on the outside and a second radial channel which passes into the receiving area starting from the depression. The actuating sleeve has a radially pre-tensioned latching element, which engages into the depression in the removal position. An ejection element is guided in the second radial channel, the ejection element being pushed into a position which partially protrudes into the receiving area and pushes the latching element out of the depression in a position which is retracted from the receiving area. The actuating sleeve remains in the removal position. The insertion of a tool is hereby facilitated. By pushing the ejection element out of the receiving area, the tool unlocks the actuating sleeve, which then, driven by the spring, automatically locks.

The tool holder requires no locking elements moved parallel to the working axis in order to be able to insert a tool without activation of the actuating sleeve. The tool holder is correspondingly shorter. Additionally, no spring is needed to hold the locking element in a slot in its position. These springs impede the mounting of tool holders.

DETAILED DESCRIPTION OF THE DRAWINGS

Identical or functionally similar elements are indicated using the same reference numbers in the figure unless otherwise noted.

Figure 1:
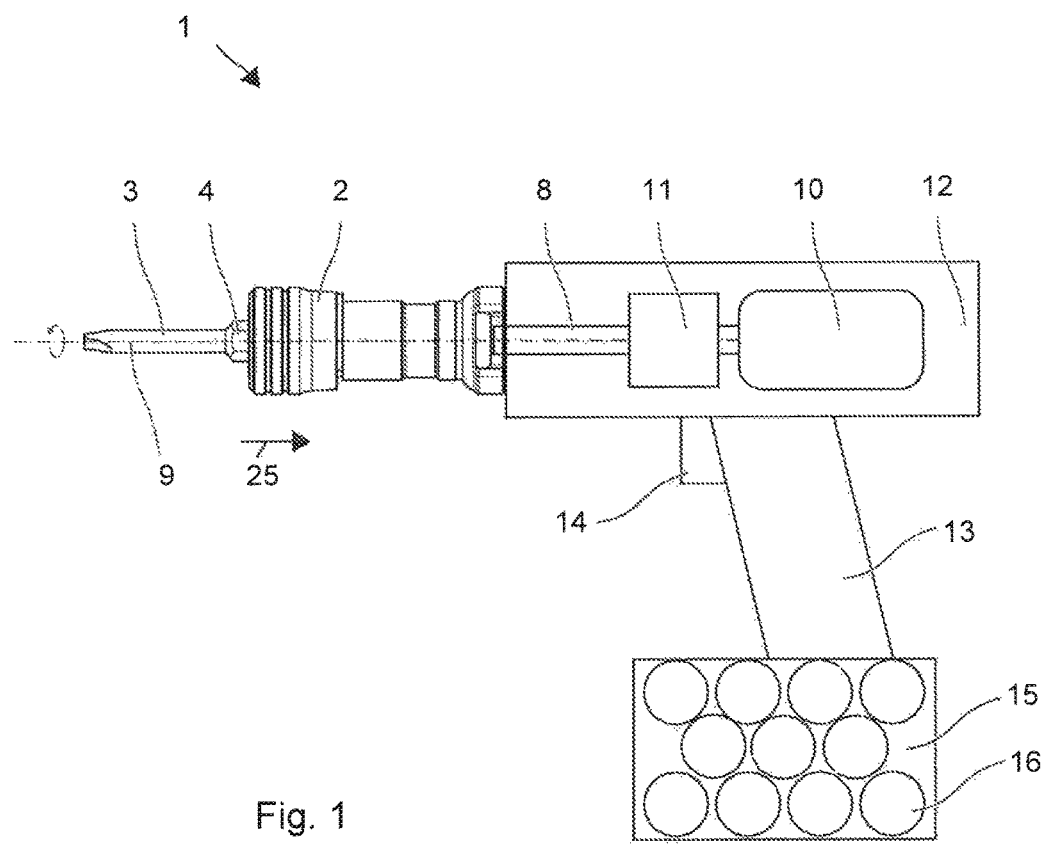
FIG. 1 illustrates an electric screwdriver.

FIG. 1 shows a schematic of an electric screwdriver (1). The electric screwdriver (1) has a tool holder (2) into which tools (3) with a prismatic shaft (4) can be inserted. Exemplary tools (3) are clamping tools, drills, and grinding tools. The prismatic, preferably six-sided shaft (4) has notches or a ring-shaped locking groove (5) in which locking elements (6) of the tool holder (2) engage in order to lock the tool (3). The locking occurs automatically when the tool (3) is inserted. The unlocking of the tool requires the movement of an actuating sleeve (7) by the user. The hold of the locking element (6) is thereby lifted and the user can pull the tool (3) out of the tool holder (2).

The tool holder (2) is placed upon a spindle (8), which is mounted such that it can be rotated around a working axis (9). The spindle (8) is coupled to an electric motor (10) using a powertrain. The powertrain may contain a transmission (11), an adjustable torque coupling, and a percussive tool, among other things. The motor (10) and the powertrain are positioned in a housing (12) of the electric screwdriver (1). A handle (13) is provided on the housing (12) for guiding the electric screw driver (1) and a system switch (14) for turning on the electric screwdriver (1). Supply of power to the electric motor (10) may occur using a detachable battery package (15) made up of several secondary battery cells (16).

The tool holder (2) has a tubular main part (17). The main part (17) can be designed as an end of the spindle (8) or, for example, attached to the end of the spindle (8) using a left-hand thread. The hollow chamber defined by the interior faces (18) of the main part (17) forms a receiving area (19) for the tool (3). The receiving area (19) is prismatic and coaxially aligned to the working axis (9). A cross-section of the receiving area (19) is preferably hexagonal. The tool (3) can be pushed into the receiving area (19) parallel to the working axis (9) in the direction of insertion (20).

The exemplary main part (17) is provided with radial channels (21). For example, two radially opposite channels

(21) can be provided. The radial channel (21) can be a circular bore whose axis is vertical or inclined to the working axis (9). A ball (6) is inserted in each of the channels (21). The channel (21) and the ball (6) preferably have approximately the same diameter. The ball (6) can be moved along the axis of the channel (21) and cannot be moved perpendicular to the axis, for example along the working axis (9). The ball (6), lying in the channel (21), partially protrudes into the receiving area (19). The ball (6) can engage into the notches or the locking groove (5) on the tool shaft (4). The channel (21) tapers in the direction of the receiving area (19) so that the ball (6) cannot fall completely into the receiving area (19). The ball (6) is an example for a locking element (6). Known alternatives are radially movable cylinders and pins or latches that can be pivoted out of the channel (21).

Figure 4:
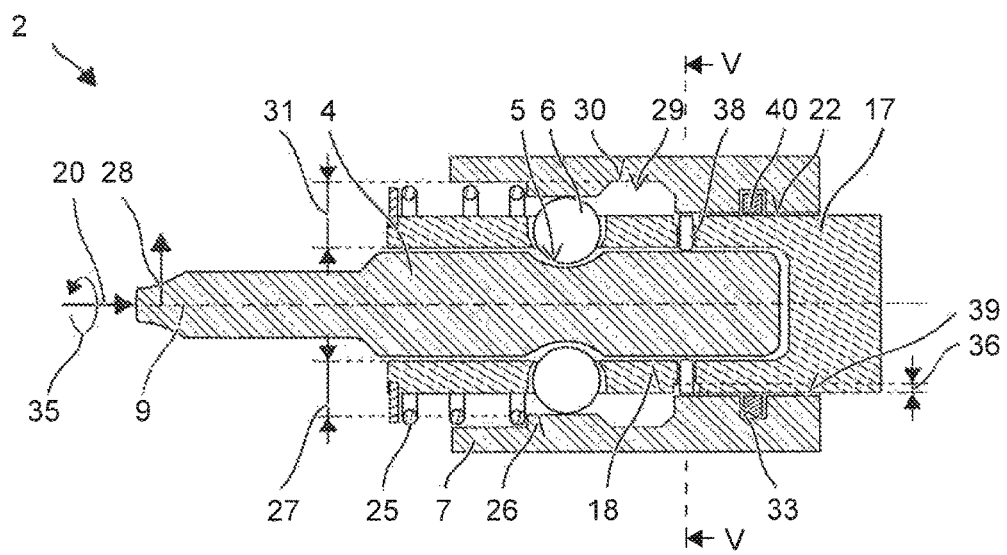
FIG. 4 illustrates the tool holder in the locking position.
Figure 5:
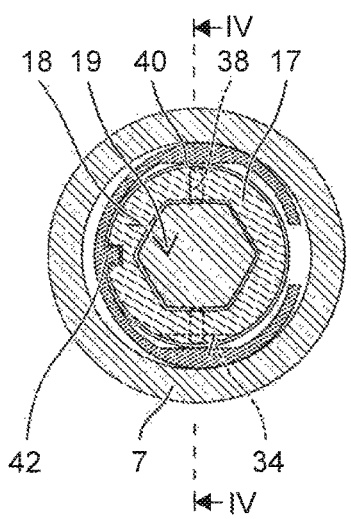
FIG. 5 is a cross-section in plane V-V of FIG. 4.

The actuating sleeve (7) is placed upon the main part (17). In the area covered by the actuating sleeve (7), the main part (17) has a preferably cylindrical or prismatic outside (22). The actuating sleeve (7) is moved on the outside (22) along the working axis (9) between a removal position (FIG. 2) and a locking position (FIG. 4). The locking position is aligned with the removal position in the direction of insertion (20) such that the tool (3) and the actuating sleeve (7) are moved in the same direction, i.e., the direction of insertion (20), upon insertion and locking. In the same way, the tool (3) and the actuating sleeve (7) are moved in the same direction, i.e., opposite to the direction of insertion (20), upon removal and unlocking.

The actuating sleeve (7) is forced in the direction of insertion (20) by a spring (25). The spring (25) is preferably already pre-tensioned in the locking position. To unlock, the user must push the actuating sleeve (7) against the spring (25) from the locking position into the removal position. After insertion of a tool (3), the spring (20) automatically pushes the actuating sleeve (7) into the locking position. The spring (25) can be a coil spring, for example. The spring (25) is aligned in front of the actuating sleeve (7) in the direction of insertion (20) and rests on the main part (17) opposite to the direction of insertion (20).

The actuating sleeve (7) has an interior face profiled along the working axis (9). A section of the interior face forms a stop face (26) for the balls (6). The stop face (26) overlaps with the channel (21) when the actuating sleeve (7) is in the locking position. A radial distance (27) from the stop face (26) to the receiving area (19) is smaller than the dimensions of the ball (6) in the radial direction (28). Accordingly, the stop face (26) forces the ball (6) to partially protrude into the receiving area (19). Neighboring the stop face (26), the interior face forms a pocket (29). The pocket (29) overlaps with the channel (21) when the actuating sleeve (7) is in the removal position. The radial interior face (30) of the pocket (29) has a radial distance (31) to the receiving area (19) which is greater than the dimensions of the ball (6) in the radial direction (28). The ball (6) can be pushed in a radial direction (28) from the receiving area (19) into the pocket (29). The locking of the tool (3) in the receiving area (19) occurs through the balls (6) which engage into the notches or into the locking groove (5) and which are held by the stop face (26) of the actuating sleeve (7) in the radial direction. The user pushes the pocket (29) over the balls (6) such that the balls (6) can move in a radial direction (28) out of the notches or the locking groove (5) when the user simultaneously pulls on the tool (3) opposite to the direction of insertion (20).

The main part (17) can be provided with two diametrically opposite depressions (32) on the outside (22). The depressions (32) can be formed as grooves (32) which run vertically to the working axis (9). The grooves (32) each have a flank (33) pointing opposite to the direction of insertion (20). The flank (33) is preferably flat and vertical to the working axis (9). The grooves (32) are preferably not closed around the working axis (9) in a ring, but rather cover only an angular area of less than 90 degrees each. A groove bottom (34) of the groove (32) runs circumferentially (35) onto the outside (22). The groove bottom (34) can be flat. A depth (36) of the groove (32) can lie within a range of 0.5 mm and 3 mm. In the exemplary embodiment, the depressions (32) are offset in relation to the channels (21) in the direction of insertion (20). Alternatively, the depressions (32) can be arranged in front of the channels (21).

The main part (17) has an additional radial channel (37). The channel (37) runs from the groove bottom (34) into the receiving area (19). The channel (37) is arranged centrally to the groove (32). A cross-section of the channel (37) is preferably smaller than the surface of the groove bottom (34). An axis of the channel (37) is vertical or inclined opposite to the working axis (9). An ejection pin (38) is inserted into the channel (37). The ejection pin (38) preferably has the same diameter as the channel (37). The ejection pin (38) can accordingly be moved along the axis, for example parallel to the radial direction (28) and trapped in the channel (37) vertically to the axis. The dimensions of the ejection pin (38) in the radial direction (28) can be greater than the radial dimensions of the channel (37). The ejection pin (38) can preferably protrude into the receiving area (19) to the extent that the ejection pin (38) no longer projects into the groove (32). Further, the ejection pin (38) can be completely pushed out of the receiving area (19) by the tool (3), whereupon the ejection pin (38) then protrudes into the groove (32). The dimensions of the ejection pin (38) are preferably approximately the same size or greater than the sum of the depth (36) of the groove (32) and the dimensions of the channel (37), i.e., the same size or greater than the distance between the outside (22) and the receiving area (19). If the ejection pin (38) is pushed out of the receiving area (19), the ejection pin (38) projects over the groove (32) up to the radial height of the outside (22). The ejection pin (38) is an example of an ejection element. Instead of an ejection pin (38), a ball can be used, for example.

The actuating sleeve (7) has a latching element (40) pre-tensioned towards the working axis (9) on the interior face (39). The latching element (40) can be a slit spring ring (40). The exemplary metallic spring ring (40) is inserted in a ring groove (41) in the interior face (39). Upon movement of the actuating sleeve (7), the spring ring (40) is also pushed along the working axis (9). The spring ring (40) can be provided with a mandrel (42) which is guided in a longitudinal groove in the main part (17). A turning of the spring ring (40) around the working axis (9) is hereby prevented.

An axial distance between the spring ring (40) and the pocket (29) is identical to the axial distance between the ejection pin (38) and the ball (6), i.e., respective to the distance between their corresponding channels (21, 37). In the removal position, the spring ring (40) overlaps with the groove (32). The spring ring (40) snaps into the groove (32). An axial dimension (width) of the spring ring (40) is preferably approximately identical to the width of the groove (32). The spring ring (40) is trapped in the groove (32) and prevented from moving in an axial manner. In particular, the flank (33) of the groove (32) prevents a pushing of the spring ring (40) in the direction of insertion (20). The spring ring (40) remains engaged with the ring groove (41) of the actuating sleeve (7). Accordingly, the actuating sleeve (7) is locked in the removal position by the spring ring (40). The locking is lifted upon insertion of a tool (3). The shaft (4) displaces the ejection pin (38) out of the receiving area (19). The ejection pin (38) enters the groove (32) and spreads the spring ring (40) at least to the extent that the axial hold by the spring ring (40) is lifted. The spring (25) then pushes the actuating sleeve (7) into the locking position as soon as the balls (6) are dropped into the latches or grooves (5) of the shaft.

Figure 6:
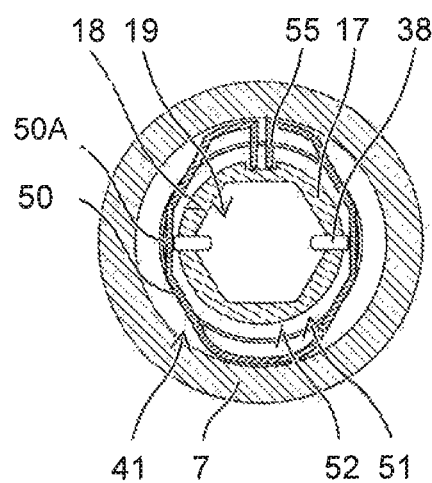
FIG. 6 is a cross-section through a tool holder.

FIG. 6 shows a spring ring (50) made out of a curved metal wire. In the illustrated locking position, the spring ring (50) overlaps with both the depression (51) in the main part (17) and the ring groove (41) in the actuating sleeve (7). The exemplary depression (51) is formed as a ring-shaped enclosure, where the groove bottom (52) is cylindrical. The spring ring (50) has two vaulted, opposite-facing sections (50A) which are dropped into the depression (51). The other sections of the spring ring (50) lie outside of the depression (51). An anti-rotation device (55) ensures that the vaulted sections (50A) lie against the ejection pins (38). If the tool (3) is inserted, the ejection pins (38) press the vaulted sections (50A) from the depression (51) into the ring groove (41). The actuating sleeve (7) can now be moved by the spring (25) along the main part (17).

Figure 2:
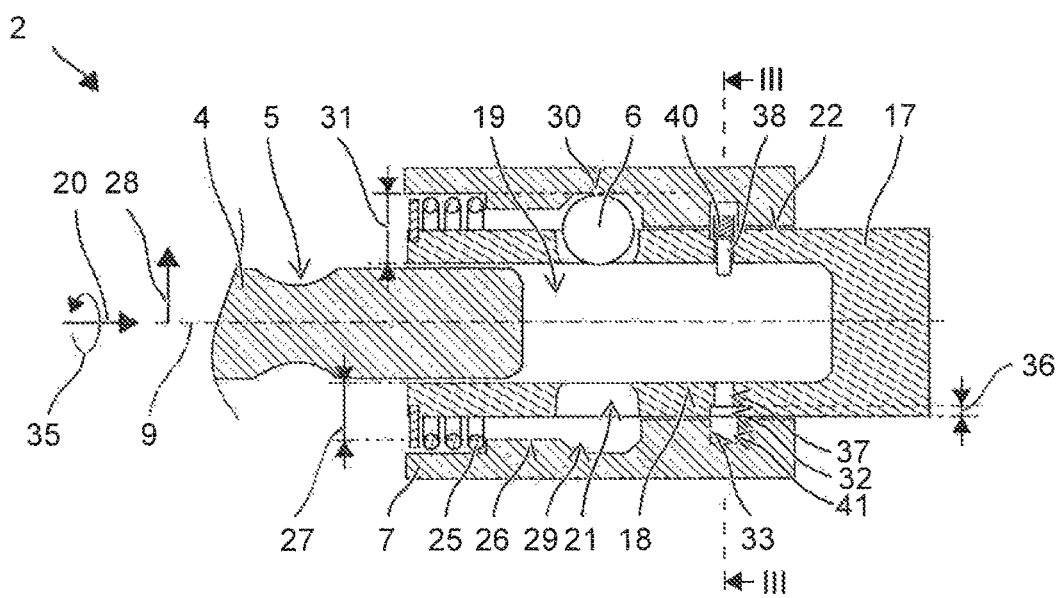
FIG. 2 illustrates a tool holder in the removal position.
Figure 3:
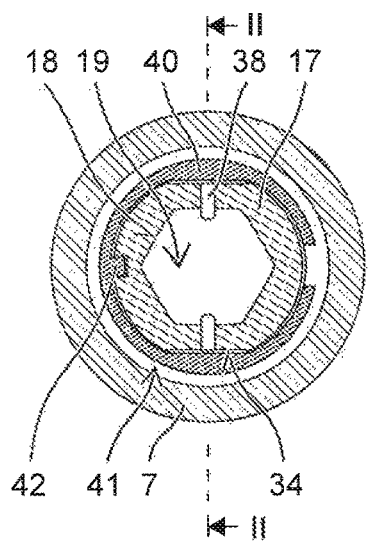
FIG. 3 is a cross-section in plane III-III of FIG. 2.

As illustrated in FIG. 2, the balls (6) and the ejection pins (38) can be arranged in a plane. Ejection pins (38) are preferably arranged opposite to the balls (6), turned around the working axis (9) at a 90-degree angle (of. FIG. 6). The ejection pin (38) enters the receiving area (19) at one of its edges.

The invention claimed is:

1. A tool holder, comprising:
a main part with a receiving area that is coaxial to a working axis, wherein a tool is receivable in the receiving area and wherein the main part has a first radial channel;
a locking element that is guidable within the first radial channel in a radial direction between a first position partially protruding into the receiving area and a second position retracted from the receiving area;
an actuating sleeve, wherein the actuating sleeve includes a stop face and a pocket, wherein the actuating sleeve is movable on the main part along the working axis between a locking position for locking the tool in the receiving area and a removal position for removing the tool from the receiving area, wherein in the locking position the stop face overlaps with the first radial channel and the locking element is holdable by the stop face in the first position, and wherein in the removal position the pocket overlaps with the first radial channel and the locking element is movable into the second position;
a spring, wherein the spring tensions the actuating sleeve in a direction from the removal position into the locking position;
wherein the main part has a depression on an outside and a second radial channel starting from the depression;
wherein the actuating sleeve includes a radially tensioned latching element which engages into the depression in the removal position, wherein the latching element has a fixed axial position with respect to the actuating sleeve; and
an ejection element, wherein the ejection element is guided in the second radial channel, wherein the ejection element is pushable by the latching element into a position which partially protrudes into the receiving area, and wherein the ejection element displaces the latching element out of the depression when the ejection element is moved to a position which is retracted from the receiving area.

2. The tool holder according to claim 1, wherein an axial distance between the locking element and the ejection element is identical to an axial distance between the pocket and the latching element.

3. The tool holder according to claim 1, wherein the depression is a groove running in a circumferential direction.

4. The tool holder according to claim 3, wherein the groove spans an angle of less than 90 degrees around the working axis.

5. The tool holder according to claim 3, wherein the second radial channel is disposed centrally in the groove.

6. The tool holder according to claim 1, wherein the latching element is a metallic spring ring.

7. The tool holder according to claim 6, wherein the metallic spring ring is inserted into an actuating sleeve groove that is open to the main part.

* * * * *